US011647046B2

(12) United States Patent
    Li

(10) Patent No.: US 11,647,046 B2
(45) Date of Patent: May 9, 2023

(54) FUZZY INCLUSION BASED IMPERSONATION DETECTION

(71) Applicant: MICROSOFT TECHNOLOGY LICENSING, LLC, Redmond, WA (US)

(72) Inventor: Weisheng Li, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 667 days.

(21) Appl. No.: 16/201,860

(22) Filed: Nov. 27, 2018

(65) Prior Publication Data

US 2020/0099718 A1     Mar. 26, 2020

Related U.S. Application Data

(60) Provisional application No. 62/735,833, filed on Sep. 24, 2018.

(51) Int. Cl.
    *H04L 29/06*     (2006.01)
    *G06N 5/04*      (2006.01)
    *H04L 9/40*      (2022.01)
    *G06N 5/048*     (2023.01)

(52) U.S. Cl.
    CPC ......... *H04L 63/1483* (2013.01); *G06N 5/048* (2013.01)

(58) Field of Classification Search
    CPC .................................................. H04L 63/1483
    See application file for complete search history.

(56) References Cited

U.S. PATENT DOCUMENTS

| 7,555,523 | B1* | 6/2009 | Hartmann | H04L 51/212 709/224 |
| 7,809,795 | B1* | 10/2010 | Cooley | G06Q 10/107 709/200 |
| 7,912,907 | B1* | 3/2011 | Mantel | H04L 51/12 709/206 |
| 8,225,413 | B1* | 7/2012 | De | G06F 21/316 726/22 |

(Continued)

OTHER PUBLICATIONS

"International Search Report and Written Opinion Issued in PCT Application No. PCT/US20/036220", dated Sep. 7, 2020, 14 Pages.

(Continued)

*Primary Examiner* — Yin Chen Shaw
*Assistant Examiner* — Alex D Carrasquillo
(74) *Attorney, Agent, or Firm* — Shook, Hardy & Bacon L.L.P.

(57) ABSTRACT

Aspects of this disclosure include fuzzy inclusion based impersonation detection technology. In one embodiment, a reverse n-gram map is created for the list of protected entities. A suspicious string may be broken into n-grams, and each n-gram of the suspicious string is to be searched in the reverse n-gram map for corresponding protected entities. A fuzzy inclusion of a protected entity may be detected in the suspicious string depending on the protected entities found during the search. Subsequently, impersonation can be identified based on the characteristics of the fuzzy inclusion. In this way, the communication system can detect impersonation techniques using visually similar text, and accordingly take various actions to help user mitigate risks caused by impersonation.

20 Claims, 8 Drawing Sheets

(56) References Cited

U.S. PATENT DOCUMENTS

| | | | |
|---|---|---|---|
| 8,515,894 B2* | 8/2013 | Yu | H04L 51/12 706/52 |
| 8,635,666 B2 | 1/2014 | Curnyn | |
| 8,725,509 B1* | 5/2014 | Harb | G06F 40/284 704/255 |
| 8,918,466 B2* | 12/2014 | Yu | H04L 51/212 709/206 |
| 9,130,778 B2* | 9/2015 | Dichiu | H04L 51/212 |
| 9,178,901 B2 | 11/2015 | Xue et al. | |
| 9,594,747 B2* | 3/2017 | Kim | G06F 40/30 |
| 9,646,061 B2* | 5/2017 | Agarwal | G06F 16/22 |
| 9,847,973 B1* | 12/2017 | Jakobsson | H04L 63/0245 |
| 10,116,678 B2* | 10/2018 | LaRosa | G10L 15/02 |
| 10,127,388 B1 | 11/2018 | Popuveniuc et al. | |
| 10,412,108 B2* | 9/2019 | LaRosa | G06F 40/289 |
| 10,673,814 B1* | 6/2020 | Huffner | H04L 61/3005 |
| 2006/0047760 A1* | 3/2006 | Encinas | H04L 51/212 709/206 |
| 2006/0149820 A1* | 7/2006 | Rajan | H04L 51/212 709/206 |
| 2009/0169019 A1 | 7/2009 | Bauchot et al. | |
| 2010/0106677 A1 | 4/2010 | Yu | |
| 2014/0067374 A1* | 3/2014 | Wilkins | G06F 16/685 704/9 |
| 2014/0074860 A1* | 3/2014 | Medelyan | G06F 16/93 707/758 |
| 2014/0074886 A1* | 3/2014 | Medelyan | G06F 16/36 707/777 |
| 2014/0095866 A1 | 4/2014 | Grebennikov et al. | |
| 2016/0217186 A1* | 7/2016 | Agarwal | G06F 16/22 |
| 2016/0277193 A1 | 9/2016 | Sabin | |
| 2016/0285856 A1 | 9/2016 | Johansson | |
| 2016/0344770 A1* | 11/2016 | Verma | G06N 20/00 |
| 2017/0242932 A1 | 8/2017 | Aravkin et al. | |
| 2018/0027013 A1* | 1/2018 | Wright | H04L 61/4511 726/23 |
| 2018/0091453 A1* | 3/2018 | Jakobsson | H04L 51/12 |
| 2018/0191754 A1* | 7/2018 | Higbee | G06F 21/554 |
| 2018/0337947 A1* | 11/2018 | Schiffman | H04L 61/10 |
| 2020/0053119 A1 | 2/2020 | Schnieders | |
| 2020/0067861 A1* | 2/2020 | Leddy | G06F 21/6245 |
| 2022/0245223 A1 | 8/2022 | CastelÃo Soares | |

OTHER PUBLICATIONS

Tian, et al., "Needle in a Haystack: Tracking Down Elite Phishing Domains in the Wild", In Proceedings of the Internet Measurement Conference, Oct. 31, 2018, pp. 429-442.

Krammer, Viktor, "Phishing Defense Against IDN Address Spoofing Attacks", In Proceedings of the International Conference on Privacy, Security and Trust, Oct. 30, 2006, pp. 1-9.

"Better Uptime and Security With Cert Spotter", Retrieved from: https://sslmate.com/certspotter/, May 17, 2019, 2 Pages.

"Certstreamcatcher", Retrieved from: https://github.com/6IX7ine/certstreamcatcher, May 22, 2019, 2 Pages.

"IDN Homograph Attack", Retrieved from: https://en.wikipedia.org/wiki/IDN_homograph_attack, Apr. 7, 2005, 2 Pages.

Ardi, et al., "AuntieTuna: Personalized Content-based Phishing Detection", In Proceedings of NDSS Workshop on Usable Security, Feb. 21, 2016, 7 Pages.

Cardwell, Mike, "Detecting Phishing Sites Using Certificate Transparency Monitoring", Retrieved from: https://www.hardenize.com/blog/certificate-transparency-monitoring-phishing-detection, Jan. 22, 2019, 4 Pages.

Dunlop, et al., "GoldPhish: Using Images for Content-Based Phishing Analysis", In Fifth International Conference on Internet Monitoring and Protection, May 9, 2010, pp. 123-128.

Finlayson, et al., "Detecting Phishing With Computer Vision: Part 2, SpeedGrapher", Retrieved from: https://www.endgame.com/blog/technical-blog/detecting-phishing-computer-vision-part-2-speedgrapher, Aug. 23, 2018, 24 Pages.

Fu, et al., "Detecting Phishing Web Pages with Visual Similarity Assessment Based on Earth Mover's Distance (EMD)", In Journal of IEEE Transactions on Dependable and Secure Computing, vol. 3, Issue 4, Oct. 2006, pp. 301-311.

Fu, et al., "EMD based Visual Similarity for Detection of Phishing Webpages", In Proceedings of International Workshop on Web Document Analysis, Jan. 2005, 4 Pages.

Grant, Daniel, "Detecting Phishing With Computer Vision: Part 1, Blazar", Retrieved from: https://www.endgame.com/blog/technical-blog/detecting-phishing-computer-vision-part-1-blazar, Aug. 21, 2018, 15 Pages.

Hallam-Baker, et al., "DNS Certification Authority Authorization (CAA) Resource Record", In Internet Engineering Task Force, RFC: 6844, Jan. 2013, 18 Pages.

Huang, et al., "Detecting Phishing Domains Using Certificate Transparency", Retrieved from: https://www.facebook.com/notes/protect-the-graph/detecting-phishing-domains-using-certificate-transparency/2037453483161459/. May 2, 2018, pp. 1-4.

Jain, et al., "Phishing Detection: Analysis of Visual Similarity Based Approaches", In Proceedings of Security and Communication Networks, Article 5421046, Jan. 10, 2017, 21 Pages.

Kleewein, Jim, "Protecting Email Data and Services", Retrieved from: https://techcommunity.microsoft.com/t5/Security-Privacy-and-Compliance/Protecting-email-Data-and-Services/ba-p/169415, Mar. 8, 2018, 5 Pages.

Larsen, Chris, "Bad Guys Using Internationalized Domain Names (IDNs)", Retrieved from: https://www.symantec.com/connect/blogs/bad-guys-using-internationalized-domain-names-idns. May 22, 2014, 16 Pages.

Liu, et al., "An Antiphishing Strategy Based on Visual Similarity Assessment", In Journal of IEEE Internet Computing, vol. 10, Issue 2, Mar. 2006, pp. 58-65.

Mao, et al., "Phishing Page Detection via Learning Classifiers from Page Layout Feature", In Proceedings of EURASIP Journal on Wireless Communications and Networking, Feb. 20, 2019, 14 Pages.

Wang, et al., "Trie-Join: Efficient Trie-based String Similarity Joins with Edit-Distance Constraints", In Proceedings of the VLDB Endowment, vol. 3, Issue 1, Sep. 2010, pp. 1219-1230.

"International Search Report and Written Opinion Issued in PCT Application No. PCT/US19/039118", dated Aug. 14, 2019, 11 Pages.

"Non Final Office Action Issued in U.S. Appl. No. 16/527,614", dated Mar. 3, 2022, 13 Pages.

"Final Office Action Issued In U.S. Appl. No. 16/527,614", dated Nov. 25, 2022, 16 Pages.

"Office Action Issued in Indian Patent Application No. 202147010613", dated Nov. 21, 2022, 6 Pages.

* cited by examiner

FUZZY INCLUSION BASED IMPERSONATION DETECTION

CROSS-REFERENCE TO RELATED APPLICATIONS

This application claims the benefit of U.S. Provisional Application No. 62/735,833, filed Sep. 24, 2018, which is assigned or under obligation of assignment to the same entity as this application, the entire contents of each application being herein incorporated by reference.

BACKGROUND

Phishing is typically done by email or instant messaging spoofing by disguising as a trustworthy entity in the electronic communication. Phishing attackers often lure users to reply emails, open attachments, or visit fake websites that are nearly identical to the corresponding legitimate sites. Phishing attackers continue to develop new techniques to bypass existing anti-phishing systems.

Impersonation is a typical technique of phishing. Email impersonation attacks attempt to emulate a famous or well-known person, trademark, or a trustworthy organization's email, among others, by spoofing a header or an email address, creating misleading URLs, or using other methods to create something that looks from a legitimate source but is actually malicious.

An advanced technique of impersonation is embedding a substring that appears visually similar to a legitimate entity in the email headers or the email body. These kind of abusive techniques present risks to the public by spreading phishing, spam, and malware content. Identifying these abuses presents a challenge. Traditional anti-phishing systems may not be able to detect this new technique of impersonation because the substring does not match with the legitimate entity via string comparison. Further, anti-phishing scan is computationally expensive in view the exponential growth of electronic communication in our modern life. An efficient technical solution for impersonation-detection is critical for instant or real time applications, and maintaining the trustworthy and efficiency of our electronic communication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of this disclosure provide an efficient approach to detect a type of impersonation that includes, for example, brand impersonation or impersonation of a person or an institution. Although the impersonated texts may visually resemble the legitimate text as if it were from the legitimate person, institution, or brand, the disclosed technology can still differentiate the impersonated texts from the legitimate text. In various embodiments, the disclosed technology can detect impersonated texts that are: 1) using Unicode characters that appear visually similar to the original characters but may be in different language scripts; 2) inserting, removing, replacing some characters of an original string; 3) prefixing, suffixing, including, or otherwise mixing the legitimate text with other text; and/or 4) mixing aforementioned impersonation methods.

In various aspects, systems, methods, and computer-readable storage devices are provided to improve a computing device's ability to detect impersonation methods. One aspect of the technology described herein is to improve a computing device's ability to generate and use various data structures for fast and efficient searching for visually similar substrings. Another aspect of the technology described herein is to improve the computing device's ability to detect impersonation based on a reverse n-gram map generated from an alternative form of protected strings. Yet another aspect of the technology described herein is to improve the computing device's ability to identify various types of fuzzy inclusions. Accordingly, training data for various types of fuzzy inclusions may be used to train a neural network and develop artificial intelligence to detect impersonation.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
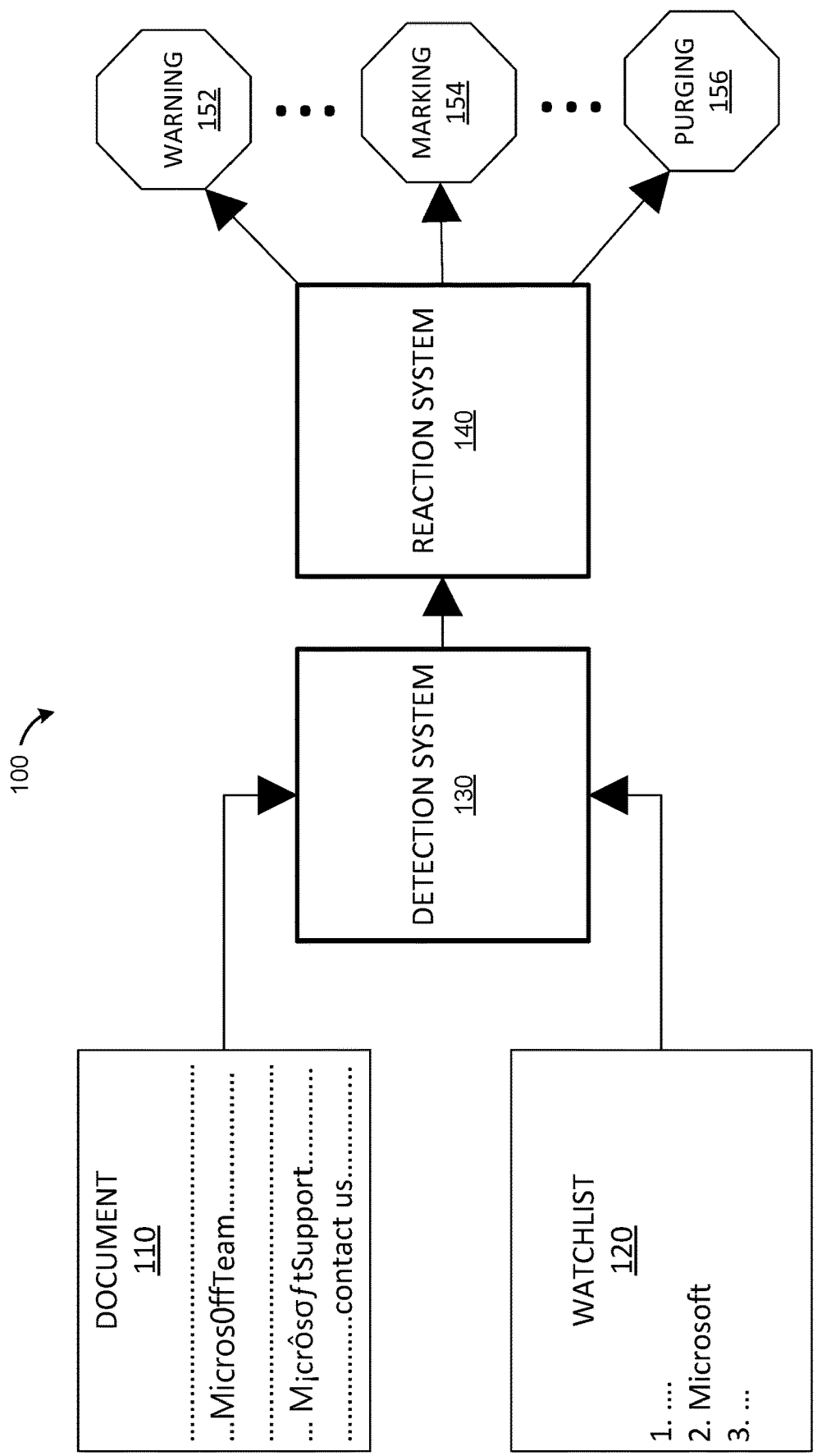
FIG. 1 is a block diagram illustrating an exemplary operating environment for implementing impersonation detection and reaction, in accordance with various aspects of the technology described herein.

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the term "based on" generally denotes that the succedent condition is used in performing the precedent action.

Electronic messages or documents, including short message service (SMS), multimedia messaging Service (MMS), Instant messaging (IM), emails, social networking messages, webpages, or even ordinary electronic documents are all vulnerable to phishing attacks. In phishing messages, impersonators make messages appear from a legitimate source, such as a famous brand, concerned organization, important person, or close friend.

To prevent detection, impersonators may embed substrings that resemble the visual presentation of a legitimate entity in the messages. By way of example, in order to make the impersonated text appear indistinguishable from the legitimate entity, an impersonator may use Unicode characters in the impersonated text that appear visually similar to the characters in the legitimate entity. An impersonator may add, delete, or swap characters from the legitimate entity with Unicode characters. Additionally, the impersonated text may be a stand-alone word or may be prefixed, suffixed, or embedded in a string of text in combination with additional characters. Non-conventional symbols or separators can also be used in the impersonated text to evade those anti-phishing techniques that are based on conventional separators. Each of these techniques may be used by impersonators for impersonation with text strings, URLs, email addresses, attachments, documents, etc.

There are conventional methods for searching similar keywords in a string based on predetermined keywords, such as the edit distance approach and the n-gram character based similarity measure technique. Comparatively, the n-gram character based similarity measure technique usually is faster than the editing distance approach. On the other hand, the editing distance approach is generally more accurate than n-gram character based similarity measure especially for keywords with only a few characters.

However, the conventional editing distance based approach and the n-gram character based similarity measure technique are deficient in handling aforementioned attacks. For example, these traditional techniques are limited in handling advanced impersonation techniques such as Unicode replacement. For instance, an impersonation attack might replace characters in a well-known word or string with other Unicode characters that resemble the original characters. These conventional methods may detect exact string match but lack the functionality to detect the replacement of characters with similar Unicode characters. Particularly, conventional methods do not find Unicode replacements in a visually similar substring embedded in a string.

In this disclosure, and at a high level, technical solutions are provided to identify a substring in a suspicious string that visually resemble a famous, well-known, or otherwise legitimate mark, person, institute, or entity ("protected string" hereinafter) based on unique data structures. A reverse n-gram map is a particular data structure created herein, which may be generated from an alternative form of the protected strings, which will be further discussed in connection with FIG. 5. In one embodiment, the converting process to the alternative form is defined by a predetermined converting protocol, such as casting every character into a common Unicode range representing a particular language, among many other rules in the converting protocol.

A reverse n-gram map is created to enable fuzzy inclusion detection. There are many types of fuzzy inclusions. As discussed above, conventional impersonating techniques, such as including the exact string of the legitimate entity (e.g., Microsoft( ) in the phishing message ("exact-inclusion" hereinafter) could be easily detected. However, new impersonating methods based on fuzzy inclusion emerged, such as inserting, removing, or replacing some characters of the legitimate entity, e.g., replacing characters of the legitimate text with Unicode characters that appear visually similar to the original characters; prefixing, suffixing, including, or otherwise mixing the legitimate text with other characters; and/or mixing aforementioned impersonation methods. To overcome these advanced impersonating methods, in various embodiments, this disclosure extends the editing distance approach from identifying fuzzy equal to identifying fuzzy inclusion, and utilizes the reverse n-gram map to effectively identify the checking targets. Advantageously, the disclosed technology can efficiently scan long documents or voluminous searching targets for impersonation.

For a fuzzy inclusion, this disclosure further classifies the fuzzy inclusion into a particular class, or label the fuzzy inclusion with the class label, based on various characteristics of the fuzzy inclusion, e.g., the start index and the end index of the impersonated substring. Subsequently, various labeled fuzzy inclusion training data may be used to train a neural network and develop artificial intelligence to detect impersonation.

In one embodiment, strings of text in a message are first quickly checked to filter out uninterested strings, e.g., stop words or any domain specific unimportant words. Those uninterested strings may be stored in an efficient data structure, such as an ordered tree data structure, for instance, a trie. This initial process advantageously reduces the required computational power and allows for faster fuzzy inclusion based visually similar searching.

In terms of the fuzzy inclusion detection, the disclosed technique may first find those strings or substrings that match the protected strings exactly in a first pass. Subsequently, in the second pass, the disclosed technique will find those strings that resemble the looking of the protected strings but may have added, deleted, or replaced characters. For example, in the first pass, any strings include the protected string of "Microsoft" may be found as instances of exact-inclusion. In the second pass, suspicious strings, such as "Microoooosoft", "Mi crôsoftTeam", or "M-i-c-r-o-s-o-f-t" would be detected as instances of fuzzy inclusions.

Continuing at the high level, the reverse n-gram map contains information of interested n-grams and their respective linked protected strings. A suspicious string is converted into its alternative form based on the same converting protocol used in building the reverse n-gram map. Each n-gram from the alternative form of the suspicious string then is used to search the reverse n-gram map. It is a hit if a protected string is found during the search. The number of hits may be compared to the number of n-grams in the protected string. Accordingly, the disclosed technique can detect a potential fuzzy inclusion of the protected string in the suspicious string based on such comparison, which is to be further discussed in connection with FIG. 7.

For a detected fuzzy inclusion, this disclosure is further to classify the fuzzy inclusion into a particular fuzzy inclusion class, or label the fuzzy inclusion with the class label, based on various characteristics of the fuzzy inclusion. Such labels may help define the level of impersonation abuse. For instance, a message with multiple types of fuzzy inclusions may represent a more sophisticated or a higher level of impersonation abuse than another message with only a single type of fuzzy inclusion.

Advantageously, various technical solutions disclosed herein improve upon conventional detection methods, for example, to detect impersonation methods using visually similar substrings, e.g., with Unicode replacements. Furthermore, by utilizing the trie data structure and the reverse n-gram map, which will be further discussed in connection with FIG. 4, the technical solutions disclosed herein operate more efficiently to support real-time applications.

Having briefly described an overview of aspects of the technology described herein, an exemplary operating environment in which aspects of the technology described herein may be implemented is described below. Referring to the figures in general and initially to FIG. 1 in particular, an exemplary operating environment for implementing impersonation detection and reaction is shown and designated generally as operating environment 100. Operating environment 100 is merely one example of a suitable computing environment and is not intended to suggest any limitation as to the scope of use or functionality of aspects of the technology described herein. Neither should operating environment 100 be interpreted as having any dependency or requirement relating to any one component nor any combination of components illustrated.

Turning now to FIG. 1, a block diagram is provided showing an operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, operating environment 100 includes two systems, namely detection system 130 and reaction system 140. It should be understood that operating environment 100 shown in FIG. 1 is an example of one suitable operating environment. Each of the systems shown in FIG. 1 may be implemented via any type of computing device, such as computing device 800 described in connection to FIG. 8, for example. These components may communicate with each other via a network, which may include, without limitation, a local area network (LAN) and/or a wide area network (WAN). In exemplary implementations, WANs include the Internet and/or a cellular network, amongst any of a variety of possible public and/or private networks.

Detection system 130, in this embodiment, receives two types of input, such as document 110 and watchlist 120. Watchlist 120 includes those protected strings, which may be customized for an industry, domain, institution, or even individual person or application. By way of example, an organization may define a specific watchlist for its email application. Document 110 is any types of document that need to be scanned for impersonation detection. In this example, document 110 may be an email message, which contains suspicious strings, such as "Micro sOftTeam", "M ¡crôsœftSupport", etc.

Detection system 130 is to detect impersonation suspects in document 110 based on watchlist 120. In various embodiments, a reverse n-gram map would be built based on watchlist 120, which would be further discussed in connection with FIGS. 3-5. When detection system 130 is to process strings, such as "MicrosOftTeam" or "M ¡crôsœftSupport" in document 110, it will first transform them into an alternative form based on the same transformation protocol used for building the reverse n-gram map, such as converting every character in the search string into corresponding Unicode characters in English if possible. Other rules for transformation may also be used, such as converting a character into another visually similar character. For instance, "m" may be converted into "rn". As a result, "MicrosOffTeam" in document 110 may be transformed into its alternative form as "rnicrosOffteam".

Then, detection system 130 is to search the reverse n-gram map for each n-gram derived from the alternative form of the search string. Based on the findings of such search process, a protected string (e.g., Microsoft) in watchlist 120 may be determined to be fuzzy-included in a search string (e.g., MicrosOffTeam). Further, detection system 130 is going to identify the type of fuzzy inclusion in this instance based on various characteristics of such fuzzy inclusion. In this case, a label of "Prefix" is assigned to "MicrosOffTeam" as the protected string "Microsoft" is a prefix of the search string "MicrosOffTeam". In summary, triplet information are generated after the initial detection process. Specifically, a protected string in watchlist 120 is linked to a suspicious string in document 110 with a label. Further, based on the label, detection system 130 may generate an impersonation measurement for document 110, which will be further discussed in detail in connection with FIG. 2.

The impersonation measurement for document 110 as well as other related information may be passed to reaction system 140. Accordingly, reaction system 140 will take various reactions based on the type and/or degree of impersonation detected by detection system 130. By way of example, for low-level suspected impersonation, reaction system 140 may just deliver a warning 152 to the recipient of the document 110. For medium-level suspected impersonation, reaction system 140 may additionally may take reaction of marking 154, which may highlighting the suspicious string or even temporarily converting it to another form to reduce its risk. For instance, the hyperlink of the suspicious string may be temporarily removed, but recoverable if the recipient decided to recover. For high-level suspected impersonation, reaction system 140 may take reaction of purging 156, which, for example, purges document 110 without even delivering it to the intended recipients.

As can be contemplated by a person skilled in the art, different application-specific or domain-specific reaction systems are likely required to solve application-specific or domain-specific impersonation problems. In various embodiments, both detection system 130 and reaction system 140 are highly customizable in solving application-specific or domain-specific impersonation problems.

Figure 2:
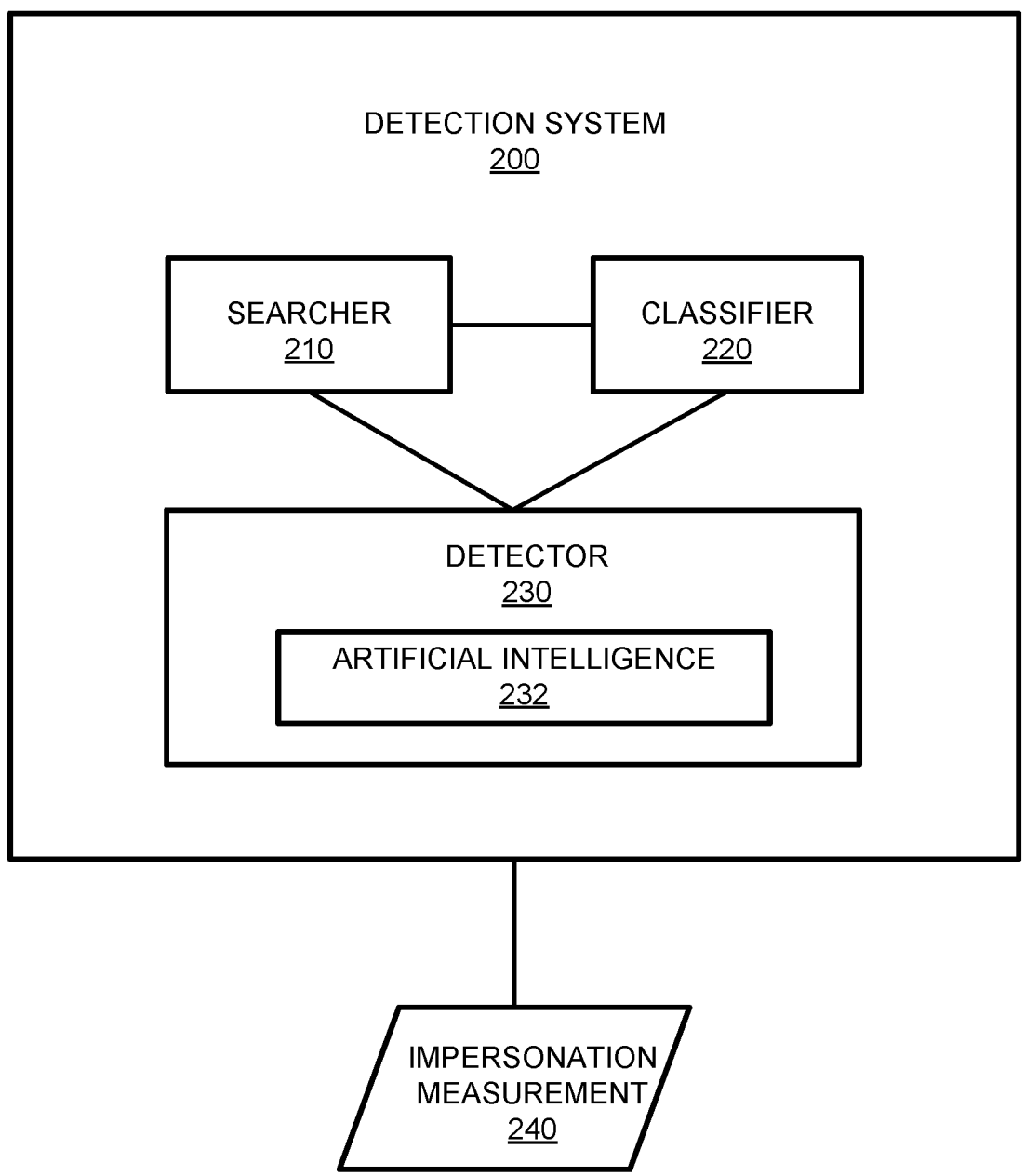
FIG. 2 is a block diagram illustrating a fuzzy inclusion based impersonation detection system in which some embodiments of the present disclosure may be employed.

Referring now to FIG. 2, a block diagram is provided showing aspects of an example fuzzy inclusion based impersonation detection system for implementing an embodiment and designated generally as detection system 200. Detection system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Detection system 200 is merely one example of system design and is not intended to suggest any limitation as to the scope of use or functionality of aspects of the technology described herein. Neither should any component in detection system 200 be interpreted as having any dependency relating to another component as illustrated. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

In this embodiment, detection system 200 is a fuzzy inclusion based impersonation detection system that includes searcher 210, classifier 220, and detector 230, among other components, which are not illustrated in FIG. 2. Detection system 200 may receive files or information like watchlist 120 and document 110, as discussed in connection with FIG. 1 for impersonation detection. By way of example only, input files for impersonation detection may include, but are not limited to, email messages, webpages, text files, PDF files, etc.

Figure 4:
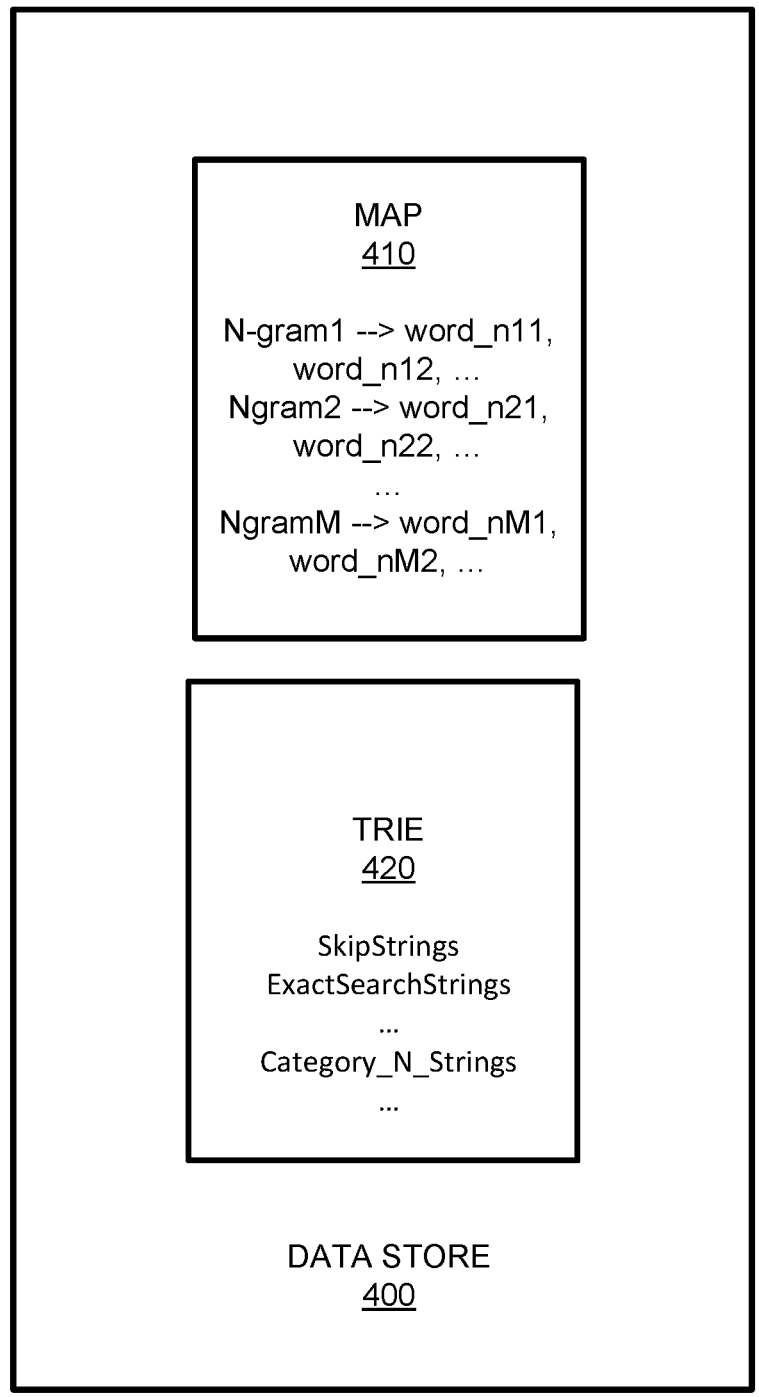
FIG. 4 is a block diagram illustrating an exemplary data store with which some embodiments of the present disclosure may be employed.
Figure 5:
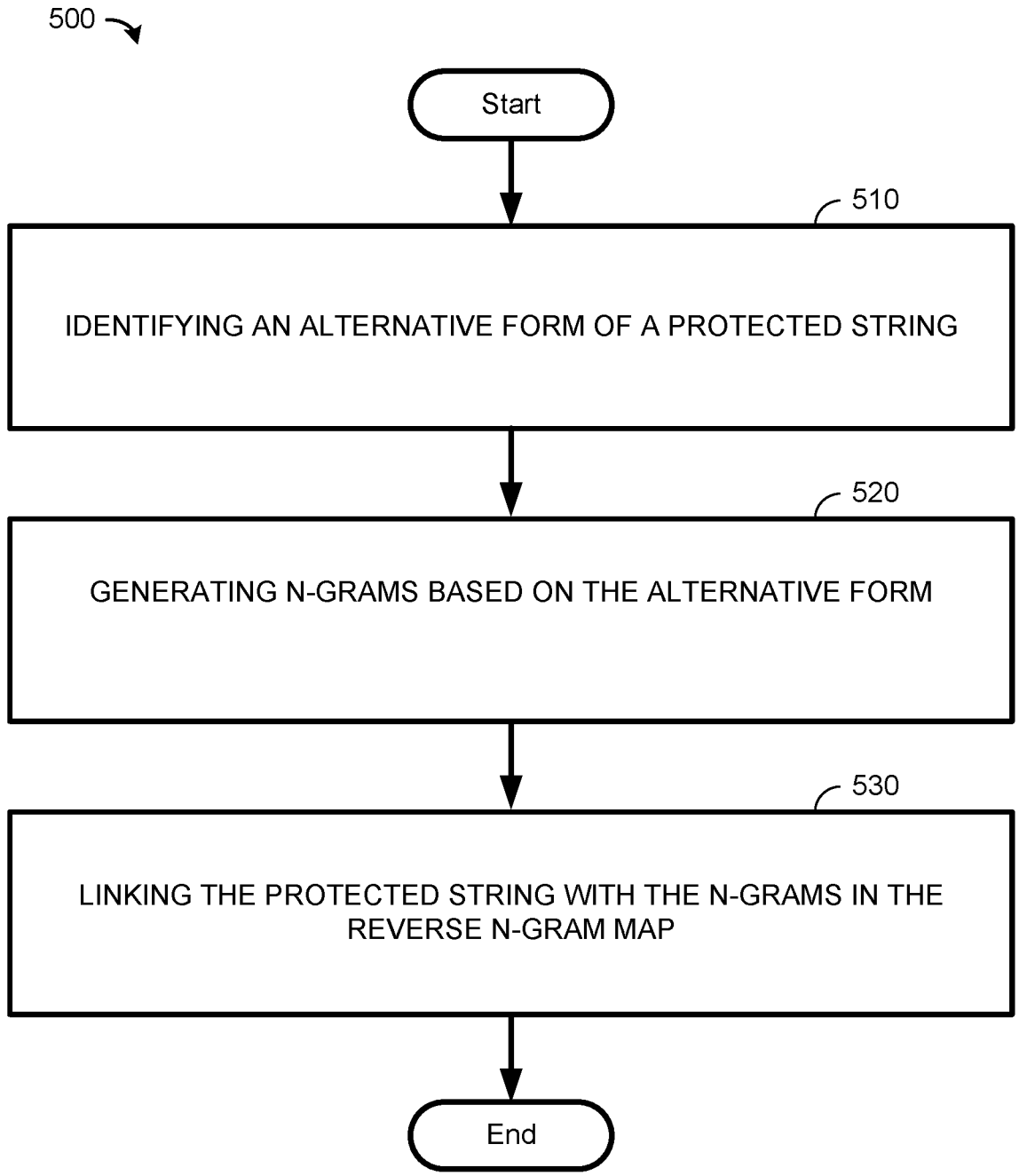
FIG. 5 illustrates a flow diagram showing an exemplary process of generating a reverse n-gram map, in accordance with an aspect of the technology described herein.
Figure 6:
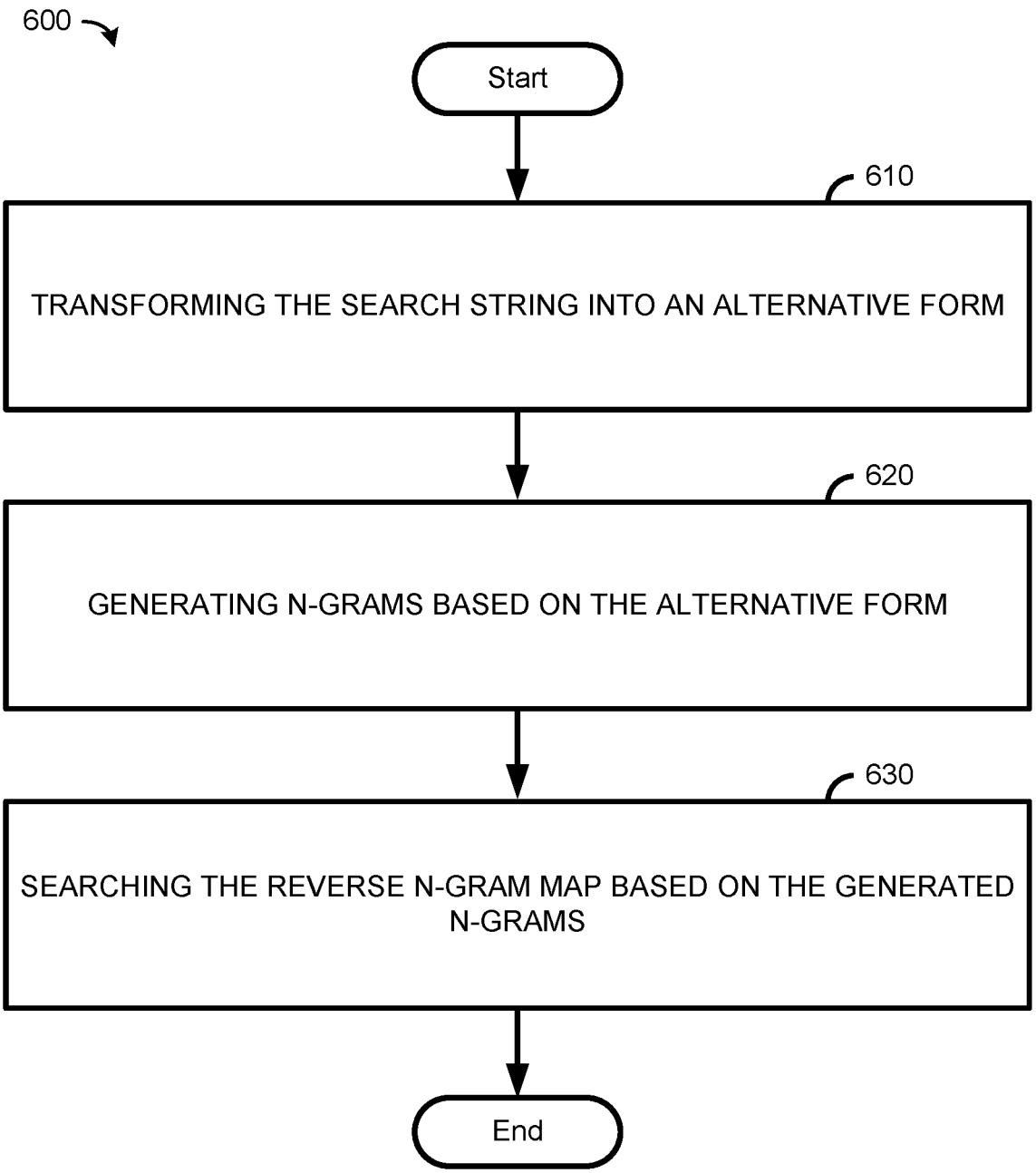
FIG. 6 illustrates a flow diagram showing an exemplary process of a searching a reverse n-gram map, in accordance with an aspect of the technology described herein.
Figure 7:
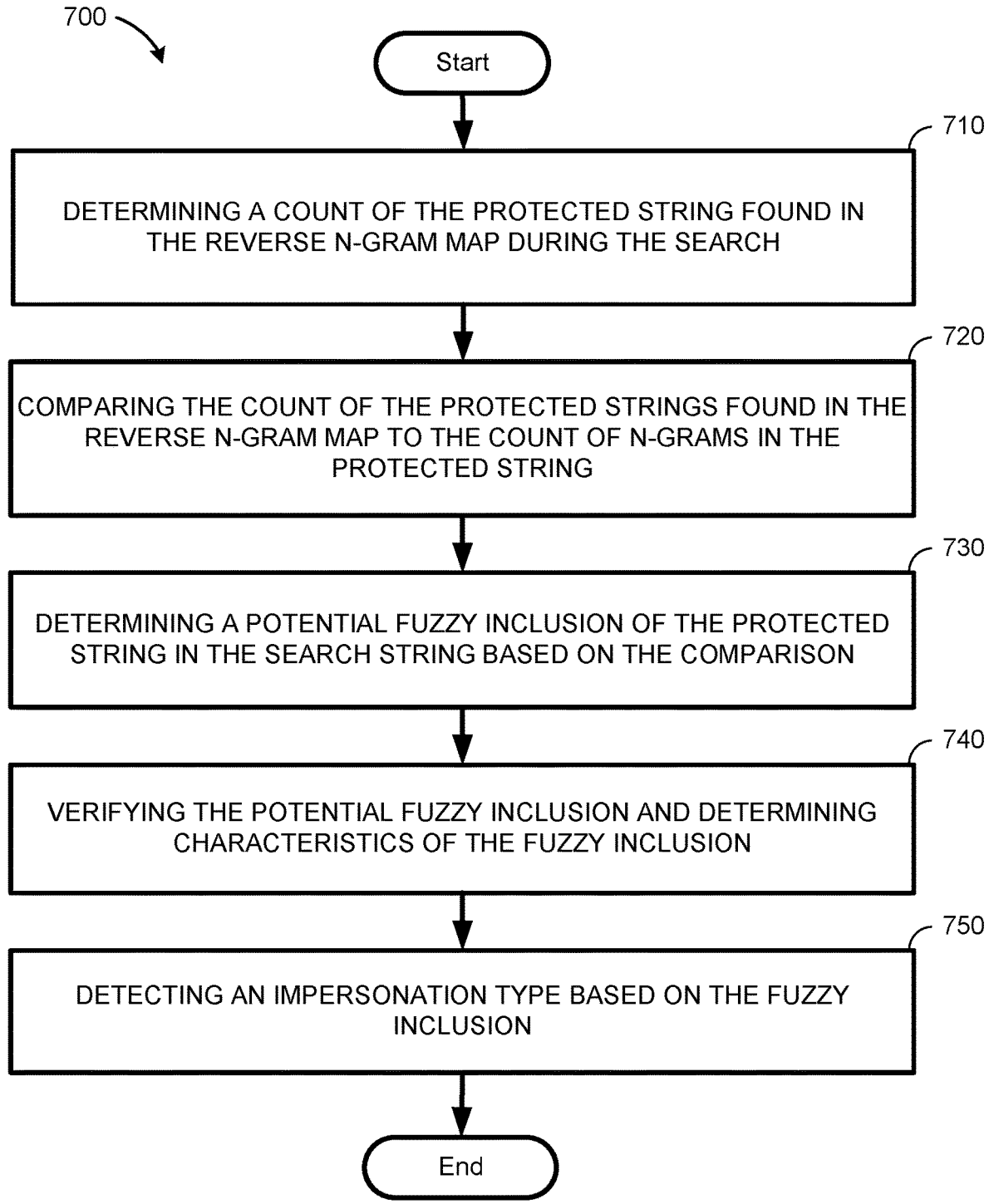
FIG. 7 is a flow diagram showing an exemplary process of determining a fuzzy inclusion, in accordance with an aspect of the technology described herein.

Searcher 210 may identify a fuzzy inclusion of a protected string in a search string. Searcher 210 may be configured to compare the protected string and the search string in their respective original forms in the first pass, e.g., for detecting exact-inclusion, then compare the protected word and the search string in their respective alternative forms in the second pass, e.g., based on a reverse n-gram map for detecting fuzzy inclusions. To detect fuzzy inclusions, searcher 210 first builds the reverse n-gram map, such as illustrated in FIG. 4, using the building process as illustrated in FIG. 5 in some embodiments. Next, searcher 210 may search the reverse n-gram map based on a search string found in a document, such as using the search process as illustrated in FIG. 6 in some embodiments. Based on the outcome of the search process, searcher 210 can determine whether a protected string is fuzzy-included in a search string, such as using the process as illustrated in FIG. 7.

For a detected fuzzy inclusion, classifier 220 may then classify the fuzzy inclusion into an impersonation type and/or determine relevant parameters associated with the impersonation type, such as illustrated in Table 1 below. In some embodiments, such classification is based on the location of the protected string in the search string, such as whether the protected string appears at the beginning, the middle, or the end of the search string. In some embodiments, such classification is based on the languages used in the search string, e.g., whether Unicode characters of multiple languages are mixed in the search string. In some embodiments, such classification is based on other characteristics of the search string or the fuzzy inclusion, such as the upper or lower cases of the characters, the length of the string, the delimiters used in the search string, whether exact-inclusion is detected in the first pass, etc.

Further, detector 230 may include artificial intelligence 232 in some embodiments. Either supervised learning or semi-supervised learning may be used in training an artificial neural networks (ANN) in artificial intelligence 232 for various tasks, including impersonation detection tasks in general or even specific classification tasks as performed by classifier 220. Supervised learning is the machine learning task of learning a function that maps an input to an output based on example input-output pairs. Semi-supervised learning uses both labeled and unlabeled data for training, such as a small amount of labeled data with a large amount of unlabeled data.

In one embodiment, artificial intelligence 232 may use the fuzzy inclusion of a protected string as a feature to train the ANN. Specifically, the labeled data, such as the triplet information as discussed above, namely, the protected string, the search string, and the type information, may be used to train the ANN to recognize impersonation in general with various deep learning techniques. With appropriate training, the ANN may output impersonation measurement 240 for a string, a paragraph, or a document. In some embodiments, impersonation measurement 240 may be a general probabilistic measurement, such as a confidence score to represent the likelihood of impersonation or the severity of the impersonation associated with a document. In some embodiments, impersonation measurement 240 may include categorical probabilistic measurements for respective types of impersonation, e.g., illustrated in Table 1, such as the severity of the type of impersonation called WeakSectionFuzzyEqual. Accordingly, reaction system 140 in FIG. 1 may take appropriate measures to mitigate the risks associated with the impersonation based on impersonation measurement 240.

However, in some embodiments, impersonation measurement 240 may be generated directly from aforementioned triplet information, e.g., based on fuzzy inclusions. By way of example, in a strict detection system, impersonation measurement 240 could be binary, i.e., true or false. Whenever the count of tuples of triplet information exceeds the threshold (e.g., 2), detection system 130 may output impersonation measurement 240 as true.

In other embodiments, hybrid impersonation measurements based on the probabilistic measures from artificial intelligence 232 and the statistical measures from classifier 220 may also be used. For example, if the statistical measures of an important type of impersonation meet certain thresholds, detection system 130 may output impersonation measurement 240 as true or 100%. Otherwise, detection system 130 may output impersonation measurement 240 as a confidence score based on the statistical measures from classifier 220 and/or the probabilistic measures from artificial intelligence 232.

Further, detection system 130 may be implemented using components such as hardware, software, firmware, a special-purpose device, or any combination thereof. Detection system 130 may be integrated into a single device or it may be distributed over multiple devices. The various components of detection system 130 may be co-located or distributed. Detection system 130 may be formed from other systems and components thereof. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, a processor executing instructions stored in memory may carry out various functions.

Figure 3:
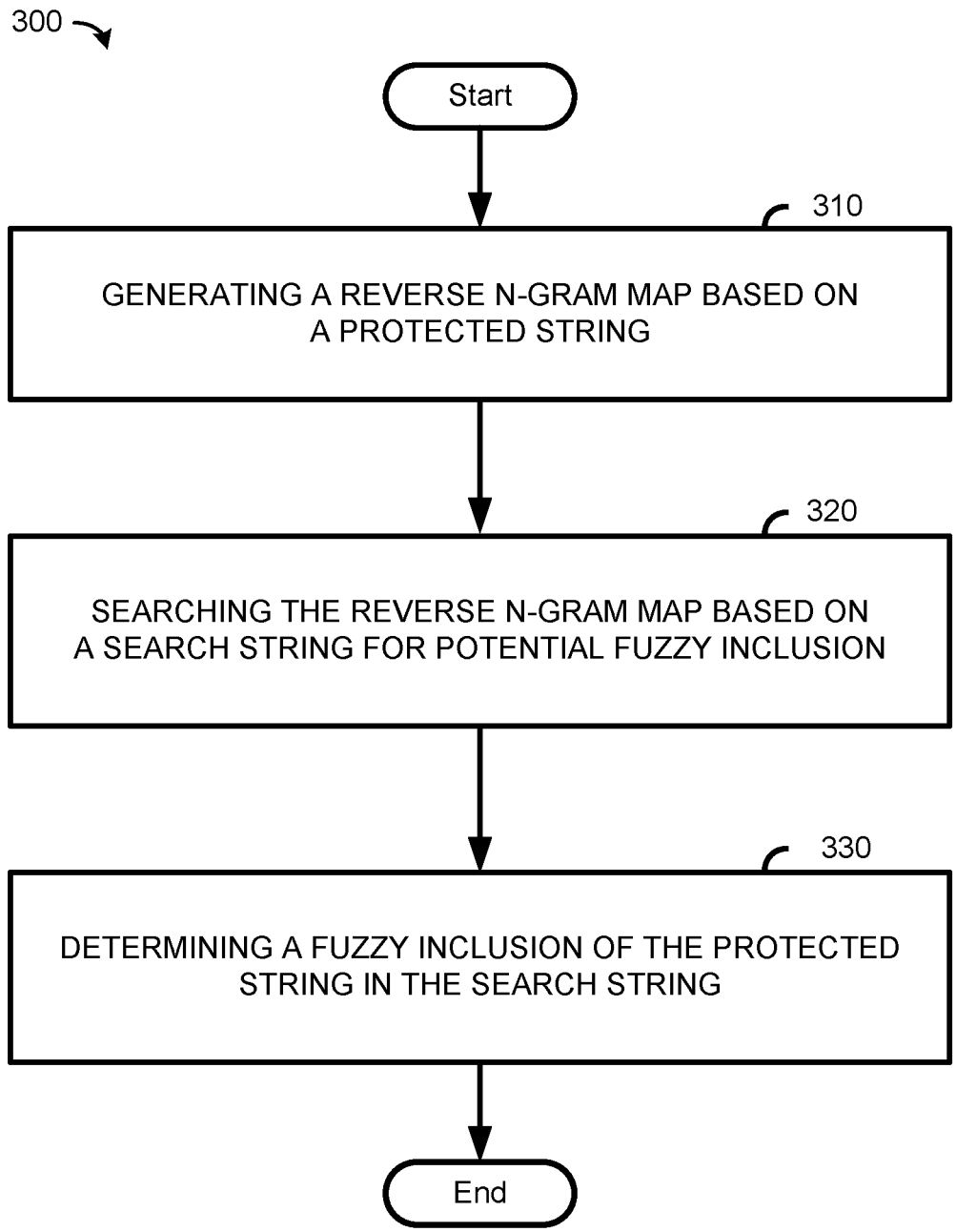
FIG. 3 illustrates a flow diagram showing an exemplary process of detecting impersonation, in accordance with an aspect of the technology described herein.

Referring now to FIG. 3, a flow diagram is provided that illustrates an exemplary process of detecting impersonation. Each block of process 300, and other processes described herein, comprises a computing process that may be performed using any combination of hardware, firmware, and/or software. For instance, various functions may be carried out by a processor executing instructions stored in memory. The process may also be embodied as computer-usable instructions stored on computer storage media. The process may be provided by an application, a service, or in combination thereof.

At block 310, a reverse n-gram map may be generated based on a protected string, e.g., by searcher 210 of FIG. 2. In some embodiments, a protected string is transformed into an alternate form, and the reverse n-gram map is generated from the alternative form. The alternate form may be generated by converting characters in the protected string into a particular range of Unicode characters in a particular language if such corresponding Unicode characters are available. Further, some characters may be converted into corresponding visually similar characters. In various embodiments, this reverse n-gram map is configured for effective fuzzy inclusion searching. This block is further discussed in connection with FIG. 5.

At block 320, the reverse n-gram map is searched for each n-gram generated from the search string, e.g., by searcher 210 of FIG. 2. The search string may be any string delimited by spaces in a document or a message. In one embodiment, only strings that are deemed as suspicious are checked. For fuzzy inclusion search, the search string will be transformed into its alternative form following the same transformation protocol for building the reverse n-gram map to be compatible. This search process at block 320 is further discussed in details in connection with FIG. 6.

At block 330, a fuzzy inclusion of the protected string in the search string may be determined, e.g., by searcher 210 of FIG. 2. It is a hit if one n-gram of the search string matches the protected string. Depends on the number of hits and the actual number of n-grams in the protected string, a fuzzy inclusion of protected string in the search string may be determined, for example, if the ratio of the hits over the number of n-grams of the protected string is greater than a predetermined threshold. This process at block 330 is further discussed in details in connection with FIG. 7.

FIG. 4 is a block diagram illustrating an exemplary data store with which some embodiments of the present disclosure may be employed. In this embodiment, data store 400 includes map 410 and trie 420. Map 410 is a reverse n-gram map. An n-gram is a contiguous sequence of n items from a given string. An n-gram of size 1 is referred to as a unigram; size 2 is a bigram; size 3 is a trigram, and so on. In some embodiments, trigrams or four-grams are used. Each entry in map 410 represents the relationship from an n-gram to a protected string. For example, n-gram1 is linked to word_n11, word_n12, etc. In this case, when n-gram1 is used as the key to search map 410, all protected strings linked to n-gram1 will be fetched.

Trie 420 used the data structure trie, which refers to an ordered tree data structure used to store a dynamic set or associative array where the keys are usually strings. Trie 420 has a number of advantages over binary search trees. As an example, looking up data in a trie is faster in the worst case compared to a binary search tree. As another example, there are no collisions of different keys in a trie.

Fuzzy inclusion search could be an expensive computational operation especially in view of the high-throughput required in some real-time systems. In various embodiments, trie 420 may be used to exclude those strings that do not require fuzzy inclusion search. Accordingly, many types of strings, e.g., other than the protected strings, may be stored in trie 420. In one example, common stop words may be stored in trie 420. In another example, the strings require exact match could also be stored in trie 420. Further, various applications may define different application-specific categories of search strings that do not require fuzzy inclusion search, and those application-specific categories of search strings may be stored in trie 420. Accordingly, during the impersonation search, an inexpensive search on trie 420 may be conducted to exclude all those known strings that do not require more expensive fuzzy inclusion search. In this way, the impersonation detection process as disclosed herein could be executed more efficiently and meet the responsiveness and throughput requirements of some real-time applications.

Turning now to FIG. 5, a flow diagram is provided that illustrates one example of generating a reverse-gram map. Each block of process 500, and other processes described herein, comprises a computing process that may be performed using any combination of hardware, firmware, and/or software. For instance, various functions may be carried out by a processor executing instructions stored in memory. The processes may also be embodied as computer-usable instructions stored on computer storage media. In various embodiments, process 500 may be performed in relation to block 310 of FIG. 3.

At block 510, an alternative form of a protected string is identified. The converting process to the alternative form is defined by a predetermined converting protocol. In some embodiments, only one alternative form is used. However, in other embodiments, more than one alternative forms may be used to cover additional variations of impersonation methods. For example, if the document was written in bilingual, the protected string may be transformed into Unicode characters in both languages.

In terms of the converting protocol, in some embodiments, all characters in the protected string are converted into corresponding Unicode characters in a default language. The default language may be preselected by the system, or dynamically determined based on the specific application or user who requests the service. In one embodiment, this default language may also be dynamically selected based on the document to be scanned. Usually, there is only a limited number of protected strings. Even if the range of Unicode is dynamically selected, the process at block 510 is still computationally inexpensive.

Many other rules may be incorporated into the converting protocol, such as converting a character into a visually similar character. Such rules may be manually configured based on the specific application. For instance, an impersonator may intentionally replace "m" with "rn" to overcome conventional anti-phishing systems as "rn" is visually similar to "m". In this case, a rule for converting "m" into "rn" may be incorporated into the converting protocol. In other embodiments, the trained ANN in artificial intelligence 232 may automatically convert the protected string into an alternative form without an explicit converting protocol.

At block 520, n-grams based on the alternative form are generated. A character n-gram is generated based on the alternate form. In some embodiments, trigrams are used. Using the example above, the alternative form for the protected string "Microsoft" may be "rnicrosoft". Accordingly, the eight trigrams of "rnicrosoft" include "mi", "nic", "icr", "cro", "ros", "oso", "sof", and "oft". As another example, if "mic" or "microphone" is another protected string, their trigrams will also include "mi" and "nic", among others. In other embodiments, other n-grams (e.g., four-grams) may be used based on the specific application.

At block 530, the protected string is linked to the n-grams in the reverse n-gram map. Each n-gram is linked to its protected strings, and such information may be stored in a reverse n-gram map, such as map 410 of FIG. 4. Continuing with above examples, trigram "mi" in the reverse n-gram map will link to "Microsoft" and "microphone", among potential other protected strings.

Turning now to FIG. 6, a flow diagram is provided that illustrates one example of searching a reverse n-gram map. Each block of process 600, and other processes described herein, comprises a computing process that may be performed using any combination of hardware, firmware, and/or software. For instance, various functions may be carried out by a processor executing instructions stored in memory. The processes may also be embodied as computer-usable instructions stored on computer storage media. In various embodiments, process 600 may be performed in relation to block 320 of FIG. 3.

Initially, at block 610, the search string is transformed into its alternative form. In various embodiments, the search string is converted into its alternative form based on the same converting protocol used in block 510. By way of example, the alternate form of the search string may also be generated by replacing its Unicode characters in the search string with corresponding Unicode characters in a target language. In one embodiment, the target language may be selected based on the primary language used in the document hosting the search string. As discussed previously, it is relatively inexpensive to dynamically build a reverse n-gram map based on the target language, especially when the number of protected strings is much less than the number of search strings.

At block 620, n-grams may be generated from the alternative form of the search string. By the same token, the same number of grams shall be chosen. For example, if trigram is used for building the reverse n-gram map, trigram also should be used for the search string for the purpose of compatibility.

At block 630, the reverse n-gram map is searched based on the generated n-grams. Each n-gram from the alternative form of the search string is used to search the reverse n-gram map. In some embodiments, repetitive n-grams are consolidated into one n-gram if the reverse n-gram map was built with the same principle. Alternatively, repetitive n-grams may be permissible if the reverse n-gram map was built with repetitive protected strings for the same n-gram. In general, as long as process 600 and process 500 use the same reversal protocol, fuzzy inclusions may be correctly determined in process 700 of FIG. 7.

Turning now to FIG. 7, a flow diagram is provided that illustrates one example of determining a fuzzy inclusion. Each block of process 700, and other processes described herein, comprises a computing process that may be performed using any combination of hardware, firmware, and/or software. For instance, various functions may be carried out by a processor executing instructions stored in memory. The processes may also be embodied as computer-usable instructions stored on computer storage media. In various embodiments, process 700 may be performed in relation to block 330 of FIG. 3.

At block 710, a count of the protected string found in the reverse n-gram map during the search is determined. In one embodiment, each n-gram extracted from the alternative form of the search string is used as a key to search the reverse n-gram map. It is a hit if a protected string is found during the search. For every hit, a hit counter for the protected string is increased one. Multiple hit counters may be used for multiple protected strings.

At block 720, the count of the protected strings found in the reverse n-gram map is compared to the count of n-grams in the protected string. In the same embodiment as discussed above, in the end of the search process, the hit counter for the protected string may be compared with the number of n-grams in the protected string. Illustrating this comparison with a previously used example, when the protected string is "Microsoft" and the search string is "Micros0ftTeam", there are eight trigrams in "rnicrosoft", including "mi", "nic", "icr", "cro", "ros", "oso", "sof", and "oft". On the other hand, there are many trigrams in "rnicros0ftteam", including "mi", "nic", "icr", "cro", "ros", "oso", "s0f", "0ft", "ftt", "tte", "tea", and "eam". After searching the reverse n-gram map, the hit counter for the protected string is "Microsoft" becomes 6. This number of hits (i.e., 6) is compared with the count of n-grams in the protected string "Microsoft" (i.e., 8).

At block 730, a potential fuzzy inclusion of the protected string in the search string is determined based on this comparison. In some embodiments, the difference of the above two counters, the count of the protected strings found in the reverse n-gram map and the count of n-grams in the protected string, may be used. For example, if the difference is less than a threshold, it may be determined that the protected string is fuzzy-included in the search string. In the above example, assuming the threshold is 3, the difference of 2 is small enough to flag the fuzzy inclusion of "Microsoft" in "Micros0ftTeam". The threshold of difference may be dynamically adjusted based on the length of the protected string. By way of example, a longer protected string may have a higher threshold. In some embodiments, a ratio of the above two counters, the count of the protected strings found in the reverse n-gram map and the count of n-grams in the protected string, may be used. For example, if the ratio is greater than a threshold, it may be determined that the protected string is fuzzy-included in the search string. In the above example, assuming the threshold is 0.6, the ratio of 0.75 in this case is also large enough to flag the fuzzy inclusion of "Microsoft" in "Micros0ftTeam".

At block 740, the potential fuzzy inclusion is further verified, and characteristics of the fuzzy inclusion may be determined. False positives of fuzzy inclusion cases may be excluded. In some cases, there are many hits in searching the reverse n-gram map, but the matched n-grams are not in agreement with their sequence as presented in the protected string. This types of false positives cases or other types of false positives cases may be differentiated from true fuzzy inclusion cases. Editing distance refers to the minimum number of operations (e.g., insertions, deletions or substitutions of a single character, or transposition of two adjacent characters) required to convert one string to the other. In some embodiments, the editing distance between the protected string and the impersonated substring in the search string, or between the protected string and the search string may be used to exclude false positive fuzzy inclusion cases. By way of example, Damerau-Levenshtein distance between the protected string and the suspected substring in the search string may be used. In the previously discussed false positive example, when the matched n-grams are not in agreement with their sequence as presented in the protected string, the editing distance between the protected string and the search string or a substring thereof is likely greater than the predetermined threshold. The threshold for editing distance may be preset or determined by the system or the user, e.g., based on the length of protected string. To summarize, at least in some embodiments, to confirm the fuzzy inclusion of a protected string in the search string, both criteria as discussed above are considered, including the difference or ratio between the count of the protected strings found in the reverse n-gram map and the count of n-grams in the protected string, as well as some measures to exclude false positive cases, such as the editing distance measure. Further, for a fuzzy inclusion case, characteristics of the fuzzy inclusion may be determined. Various characteristics may be considered, e.g., as partially presented in the Table 1 below, including the editing distance as discussed herein, the start index and end index of the fuzzy inclusion, the upper case or lower case in the search string, the language(s) used in the search string, the length of the search string, etc. In some embodiments, the start index and end index of the fuzzy-included protected string in the search string may be determined, e.g., by minimizing an editing distance between the protected string and a substring of the search string. Many other characteristics of the fuzzy inclusion may also be determined in other embodiments.

At block 750, an impersonation type based on the fuzzy inclusion is classified. In various embodiments, a fuzzy inclusion of the protected string in the search string is assigned a type based characteristics of the fuzzy inclusion. By way of example, the impersonation type may be assigned based on the respective length or case (upper case vs lower case) of the protected string and the search string. Further, the impersonation type may be assigned based on which part of the substring matches the protected string, e.g., the prefix or the suffix.

By way of example only, if the protected string is "Microsoft" and the search string is "356MicrosoftOffice," a type of "Include" may be used to label this impersonation as the protected string is included in the middle of the search string. As another example, consider the search string "officemicr0soft", a type of "Suffix" may be used to label this impersonation as the fuzzy-included substring of "micr0soft" is the suffix of the search string.

As another example only, if the protected word is "Microsoft" and the search string is "Mi crôsoft Team", the type of "SectionFuzzyEqual" could be used here because the search string partially resembles the protected string but contains replaced characters. As yet another example, for the search string "Microoooooosoft", the type of "WeakEqual" could be used here because the search string is largely identical to the protected string, but contains some additional characters.

The above illustrative examples by no means are inclusive of every type of impersonation. Particularly, the impersonation types may be added or modified by a user or application based on specific needs in various embodiments. By way of example only, Table 1 below indicates various types or parameters that may be used in some embodiments.

TABLE 1

| Types and Parameters | |
|---|---|
| Types/Parameters | Description |
| Equal | Search string and protected string are equal |
| SectionFuzzyEqual | Natural token of the search string is fuzzy-equal to the protected string. In a non-domain case, the delimiter for the natural token is the Unicode space. In a domain case, the delimiter is Unicode dots. In this case, fuzzy-equal means the editing distance is the threshold. |
| WeakSectionFuzzyEqual | Extended token of the search string is fuzzy-equal to the protected string. The extended token is not a natural token but another delimiter such as a dash, underscore, and other visual separators. |
| Include | The matched substring is in the middle of the protected string with obvious separators. |
| Prefix | The fuzzy-matched part is the prefix of a natural toke to the protected string. |
| Suffix | The fuzzy-matched part is the suffix of a token to the protected string. |
| WeakPrefix | The fuzzy-matched part is the prefix of an extended token of the protected string. |
| WeakSuffix | The fuzzy-matched part is the suffix of an extended token of the protected string. |
| WeakEqual | The fuzzy-matched part and the protected string have the same length. |
| NormalizedTrieMatch | Search for a match in the Trie before executing the fuzzy-match process. |
| Passorder | Indicates if the fuzzy-check has been passed either in the first time or other times after. For clarity, if a fuzzy-match is not found in the first pass, but found in, for example, the second pass which checks for alternative strings, the abuse is stronger. |
| LanguageScriptMixStatus | The language script used in the original text may be identified when generating alternative text. If the languages are mixed this is a strong signal of impersonation abuse. |
| FuzzyIncludeDistance | The editing distance between the fuzzy-substring and the original search string. This parameter helps identify the similarities between the compared texts. |
| SameCase | Indicates if the matched part of the search string has the same case (upper or lower) as the protected string. |

TABLE 1-continued

Types and Parameters

| Types/Parameters | Description |
| --- | --- |
| CamelStyle | Indicates if an uppercase letter separates the fuzzy-included part in the search string visually. |
| StartIndex | The start index of the substring that fuzzy-matches the protected string. |
| EndIndex | The end index of the substring that fuzzy-matches the protected string. |

Accordingly, we have described various aspects of technology that detect impersonation and reduce risks of impersonation. It is understood that various features, sub-combinations, and modifications of the embodiments described herein are of utility and may be employed in other embodiments without reference to other features or sub-combinations. Moreover, the order and sequences of steps shown in the above example processes are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 8:
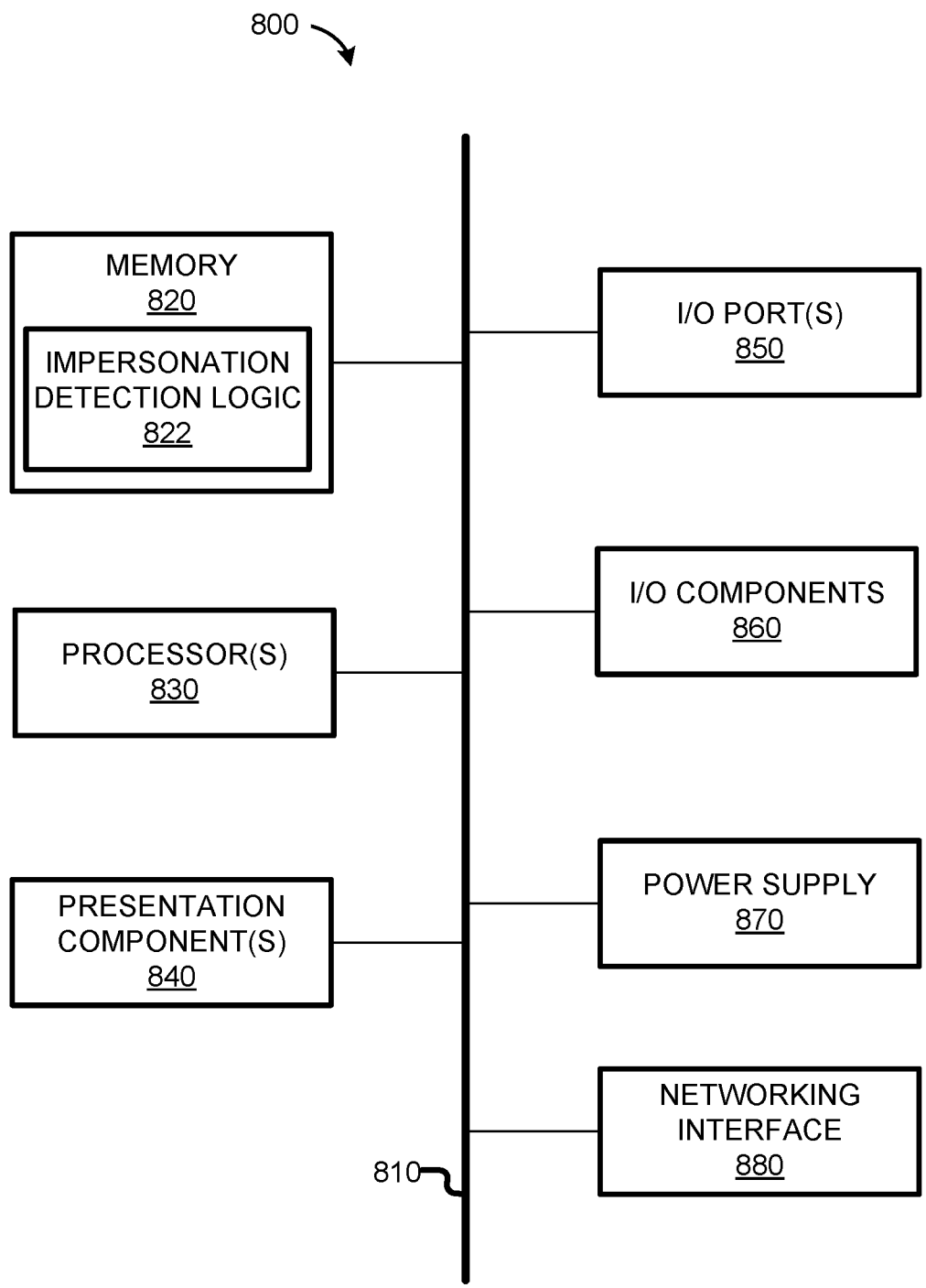
FIG. 8 is a block diagram of an exemplary computing environment suitable for use in implementing aspects of the technology described herein.

Referring to the drawings in general, and initially to FIG. 8 in particular, an exemplary operating environment for implementing aspects of the technology described herein is shown and designated generally as computing device 800. Computing device 800 is but one example of a suitable computing environment and is not intended to suggest any limitation as to the scope of use of the technology described herein. Neither should the computing device 800 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

With continued reference to FIG. 8, computing device 800 includes a bus 810 that directly or indirectly couples the following devices: memory 820, processors 830, presentation components 840, input/output (I/O) ports 850, I/O components 860, and an illustrative power supply 870. Bus 810 may include an address bus, data bus, or a combination thereof. Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with different aspects of the technology described herein. Distinction is not made between such categories as "workstation," "server," "laptop," "handheld device," etc., as all are contemplated within the scope of FIG. 8 and refers to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 820 includes computer storage media in the form of volatile and/or nonvolatile memory. The memory 820 may be removable, non-removable, or a combination thereof. Exemplary memory includes solid-state memory, hard drives, optical-disc drives, etc. Computing device 800 includes processors 830 that read data from various entities such as bus 810, memory 820, or I/O components 860. Presentation component(s) 840 present data indications to a user or other device. Exemplary presentation components 840 include a display device, speaker, printing component, vibrating component, etc. I/O ports 850 allow computing device 800 to be logically coupled to other devices, including I/O components 860, some of which may be built in.

In various embodiments, memory 820 includes, in particular, temporal and persistent copies of impersonation detection logic 822. Impersonation detection logic 822 includes instructions that, when executed by processors 830, result in computing device 800 performing impersonation detection functions, such as, but not limited to, process 300, 500, 600, and 700. In various embodiments, impersonation detection logic 822 includes instructions that, when executed by processor(s) 830, result in computing device 800 performing various functions associated with, but not limited to, detection system 130 or reaction system 140 in connection with FIG. 1; or searcher 210, classifier 220, or detector 230 in connection with FIG. 2.

In some embodiments, processors 830 may be packaged together with impersonation detection logic 822. In some embodiments, processors 830 may be packaged together with impersonation detection logic 822 to form a System in Package (SiP). In some embodiments, processors 830 can be integrated on the same die with impersonation detection logic 822. In some embodiments, processors 830 can be integrated on the same die with impersonation detection logic 822 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 830 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 800 may include networking interface 880. The networking interface 880 includes a network interface controller (NIC) that transmits and receives data. The networking interface 880 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 880 may include a wireless terminal adapted to receive communications and media over various wireless networks. Computing device 800 may communicate via wireless protocols, such as Code Division Multiple Access (CDMA), Global System for Mobiles (GSM), or Time Division Multiple Access (TDMA), as well as others, to communicate with other devices via the networking interface 880. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using any one of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A computer-implemented method, comprising:
   accessing a search string associated with an electronic message;
   generating an alternative form of the search string using a transformation protocol that replaces original characters with Unicode characters or visually similar characters;
   identifying a plurality of n-grams of the alternative form of the search string;
   accessing a reverse n-gram map comprising n-grams mapped to a plurality of protected strings, wherein the reverse n-gram map comprises n-grams of alternative forms of the plurality of protected strings, the alternative forms of the plurality of protected strings are generated based on the transformation protocol;
   searching the reverse n-gram map for the plurality of n-grams of the alternative form of the search string;
   based on searching the reverse n-gram map, determining a count of the plurality of n-grams of the alternative form of the search string that correspond to a protected string of the plurality of protected strings associated with the reverse n-gram map;
   based on the count, determining that the search string is an instance of fuzzy inclusion of the protected string; and
   based on determining that the search string is the instance of fuzzy inclusion of the protected string, executing a modification operation associated with the electronic message.

2. The method of claim 1, wherein the transformation protocol comprises replacing a letter of a string with another letter based on a visual similarity between the letter and the another letter.

3. The method of claim 1, wherein the transformation protocol comprises replacing a letter of a string from one language to another language.

4. The method of claim 1, further comprising:
   creating the reverse n-gram map for the protected string of the plurality of protected strings by associating the protected string with each n-gram of the protected string in a data structure representing the reverse n-gram map.

5. The method of claim 1, wherein determining that the search string is the instance of fuzzy inclusion of the protected string is based on a ratio of n-grams of the plurality of n-grams of the alternative form of the search string that match n-grams of an alternative form of the protected string.

6. The method of claim 1, further comprising:
   locating a start index and an end index for the instance of fuzzy inclusion by minimizing an editing distance between the protected string and a sub string of the search string determined by the start index and the end index.

7. The method of claim 1, further comprising:
   using the instance of fuzzy inclusion of the protected string as a feature to train a neural network; and
   using the neural network to detect fuzzy inclusions in electronic messages.

8. A computer storage device comprising computer-implemented instructions stored thereon that, when used by one or more hardware computer processors of a computing device, cause the computing device to:
   access a search string associated with an electronic message;
   generate an alternative form of the search string using a transformation protocol that replaces original characters with Unicode characters or visually similar characters;
   identify a plurality of n-grams of the alternative form of the search string;
   access a reverse n-gram map comprising n-grams mapped to a plurality of protected strings, wherein the reverse n-gram map comprises n-grams of alternative forms of the plurality of protected strings, the alternative forms of the plurality of protected strings are generated based on the transformation protocol;
   search the reverse n-gram map for a plurality of n-grams of an alternative form of a search string associated with an electronic message;
   based on searching the reverse n-gram map, determine a count of the plurality of n-grams of the alternative form of the search string that correspond to a protected string of the plurality of protected strings associated with the reverse n-gram map;
   based on the count, determine that the search string is an instance of fuzzy inclusion of the protected string; and
   based on determining that the search string is the instance of fuzzy inclusion of the protected string, execute a modification operation associated with the electronic message.

9. The computer storage device of claim 8, wherein the transformation protocol comprises replacing a letter of a string with another letter based on a visual similarity between the letter and the another letter.

10. The computer storage device of claim 8, wherein the instructions further cause the computing device to determine the instance of fuzzy inclusion of the protected string in the search string based on a ratio of n-grams of the plurality of n-grams of the alternative form of the search string that match n-grams of an alternative form of the protected string.

11. The computer storage device of claim 8, wherein the instructions further cause the computing device to create the reverse n-gram map for the protected string of the plurality of protected strings by associating the protected string with each n-gram of the protected string in a data structure representing the reverse n-gram map.

12. The computer storage device of claim 8, the instructions further cause the computing device to:
   assign a type to the instance of fuzzy inclusion of the protected string in the search string based on a characteristic of the instance of fuzzy inclusion.

13. The computer storage device of claim 12, the instructions further cause the computing device to:
   locate a start index and an end index for the instance of fuzzy inclusion by minimizing an editing distance between the protected string and a sub string of the search string determined by the start index and the end index; and
   assign the type based on the start index, the end index, or the editing distance.

14. The computer storage device of claim 12, wherein the type is assigned based on respective lengths or cases of the protected string and the search string.

15. The computer storage device of claim 12, wherein the characteristic of the instance of fuzzy inclusion includes a delimiter in the search string, a language used in the search string, or a count of languages used in the search string.

16. The computer storage device of claim 12, the instructions further cause the computing device to:
   use the type of the instance of fuzzy inclusion as a feature to train a neural network; and
   utilize the neural network to detect fuzzy inclusions in electronic messages.

17. An apparatus for detecting impersonation, comprising:
   one or more hardware computer processors;
   computer memory storing computer-usable instructions that, when used by the one or more hardware computer processors, cause the one or more hardware computer processors to perform operations, the operations comprising:
   accessing a search string associated with an electronic message;
   generating an alternative form of the search string using a transformation protocol that replaces original characters with Unicode characters or visually similar characters;
   identifying a plurality of n-grams of the alternative form of the search string;
   accessing a reverse n-gram map comprising n-grams mapped to a plurality of protected strings, wherein the reverse n-gram map comprises n-grams of alternative forms of the plurality of protected strings, the alternative forms of the plurality of protected strings are generated based on the transformation protocol;
   searching the reverse n-gram map for a plurality of n-grams of an alternative form of a search string associated with an electronic message;
   based on searching the reverse n-gram map, determining a count of the plurality of n-grams of the alternative form of the search string that correspond to a protected string of the plurality of protected strings associated with the reverse n-gram map;
   based on the count, determining that the search string is an instance of fuzzy inclusion of the protected string; and
   based on determining that the search string is the instance of fuzzy inclusion of the protected string, execute a modification operation associated with the electronic message.

18. The apparatus of claim 17, wherein the transformation protocol comprises replacing a letter of a string with another letter based on a visual similarity between the letter and the another letter.

19. The apparatus of claim 17, the operations further comprising creating the reverse n-gram map for the protected string of the plurality of protected strings by associating the protected string with each n-gram of the protected string in a data structure representing the reverse n-gram map.

20. The apparatus of claim 17, wherein determining that the search string is the instance of fuzzy inclusion of the protected string is based on a ratio of n-grams of the plurality of n-grams of the alternative form of the search string that match n-grams of an alternative form of the protected string.

* * * * *